Aug. 16, 1960 — L. C. NOLTE — 2,949,139
MITER BOX FOR PORTABLE ELECTRIC SAWS
Filed Oct. 19, 1959 — 2 Sheets-Sheet 1

INVENTOR.
Louis C. Nolte
BY Julius L. Gubinstein
Attorney

Aug. 16, 1960   L. C. NOLTE   2,949,139
MITER BOX FOR PORTABLE ELECTRIC SAWS
Filed Oct. 19, 1959   2 Sheets-Sheet 2

INVENTOR.
Louis C. Nolte
BY
Julius L. Rubinstein
Attorney

United States Patent Office 2,949,139
Patented Aug. 16, 1960

2,949,139

MITER BOX FOR PORTABLE ELECTRIC SAWS

Louis C. Nolte, 415 E. Potter, Wood Dale, Ill.

Filed Oct. 19, 1959, Ser. No. 847,411

15 Claims. (Cl. 143—6)

This invention relates to a miter box and more particularly to a miter box for portable electric saws.

A miter box for a saw is a device for guiding the saw so it can cut the work, usually wood, at various mitering angles with respect to its edge. Heretofore, available mitering devices for portable electric saws were attachments rather than miter boxes because they were not self contained units and were not adapted to be used alone. In particular, these prior devices were designed to be attached to a table top by screws or bolts. This was objectionable because screw-attached devices are not truly portable. Furthermore, suitable tables are not always available at places where the mitering device is to be used.

In addition, even if these mitering devices were only used in one shop, they either had to be left attached to the table top, which was objectionable because it took up room and rendered the table unfit for other purposes, or if the device was removed from the table top and put away, the user first had to go to the trouble of disconnecting it from the table, and later when the mitering device was again to be used, he had to go to the trouble of reconnecting it.

It is apparent that a relatively compact, simple to use, easy to manufacture miter box for portable electric saws which operates as a self contained unit and does not require the use of a table or any other special attaching member would be desirable and useful.

Another troublesome problem connected with prior mitering devices was that whenever it became necessary to put a different diameter saw blade in the portable electric saw, the distance between the work supporting surface and the guide track of the mitering device had to be varied. Heretofore this adjustment was done either by pivotally mounting one end of the guide track on a continuously adjustable vertical support or by using shims.

The use of shims was objectionable because they often became misplaced. The use of the continuously adjustable vertical support for the guide track was objectionable both because it created difficulties in leveling the guide track, and because the complete mechanism was expensive to make and somewhat difficult to operate. Besides this, taking into consideration the fact that the overwhelming majority of the board cut by these mitering devices comes in standard 1 inch, 2 inch and 4 inch sizes, it would be wasteful to mount the guide track on the more expensive continuously adjustable support when a simpler more economical support adjustable only to the standard board size encountered in practice would be just as satisfactory.

It is evident that it would be desirable and most economical for a miter box for portable electric saws to be designed with a simple self contained adjusting mechanism so that the miter box can cut just the board sizes most commonly in use.

Among other things, therefore, one important object of this invention is to provide a miter box for portable electric saws having all the above described attractive features.

This and other objects of this invention will become more apparent when read in the light of the accompanying drawing and specification wherein.

Figure 1:
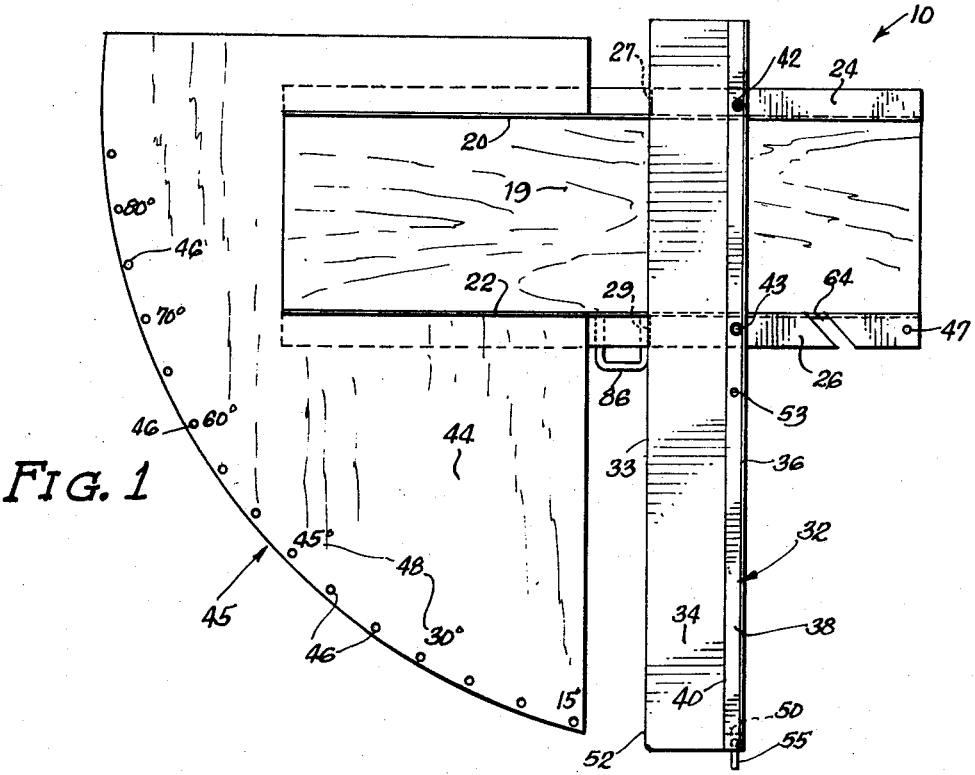
Fig. 1 is a plan view of one embodiment of the miter box constructed according to the principles of this invention.
Figure 3:
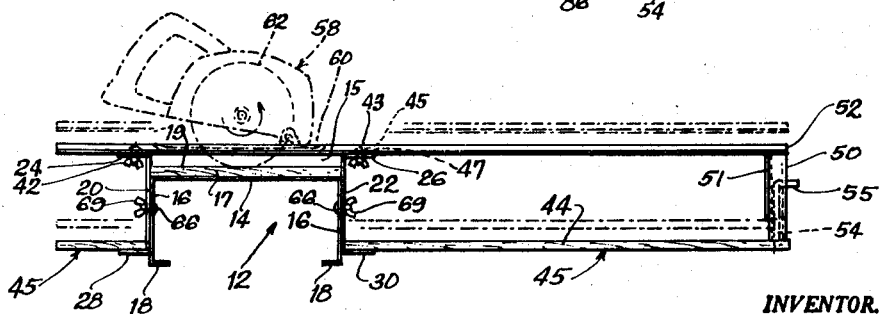
Fig. 3 is an end elevational view of the miter box shown in Fig. 1.

Referring now to Fig. 1 of the drawings, one embodiment of the miter box for portable electric saws indicated generally by the reference numeral 10 comprises a straight elongated generally channel shaped base indicated generally by the reference numeral 12. As best seen in Fig. 3, the base includes an upper web portion 14 and downwardly extending leg portions 16 terminating in feet 18. A wooden work support member 17 with an upper work supporting surface 19 is secured to the web portion 14 by any conventional means for grazing engagement with the edge of the saw blade in a manner well known in the art. The base of the miter box is formed from sheet metal. This is the most desirable practice from the standpoint of manufacture, cost, and portability, because the entire base section can be formed from a single piece of sheet metal and because the resulting structure is comparatively light making it easier to carry.

Straight planar side walls 20 and 22 are adjustably mounted on the outer surfaces of the legs 16. These side walls extend above the web portion 14 defining thereby a straight channel or guideway 15 for the work (boards, bricks, pipe, etc.). The upper and lower parts of these side walls are bent horizontally to form upper supporting surfaces 24 and 26, and lower support flanges 28 and 30 (see Fig. 3).

Figure 4:
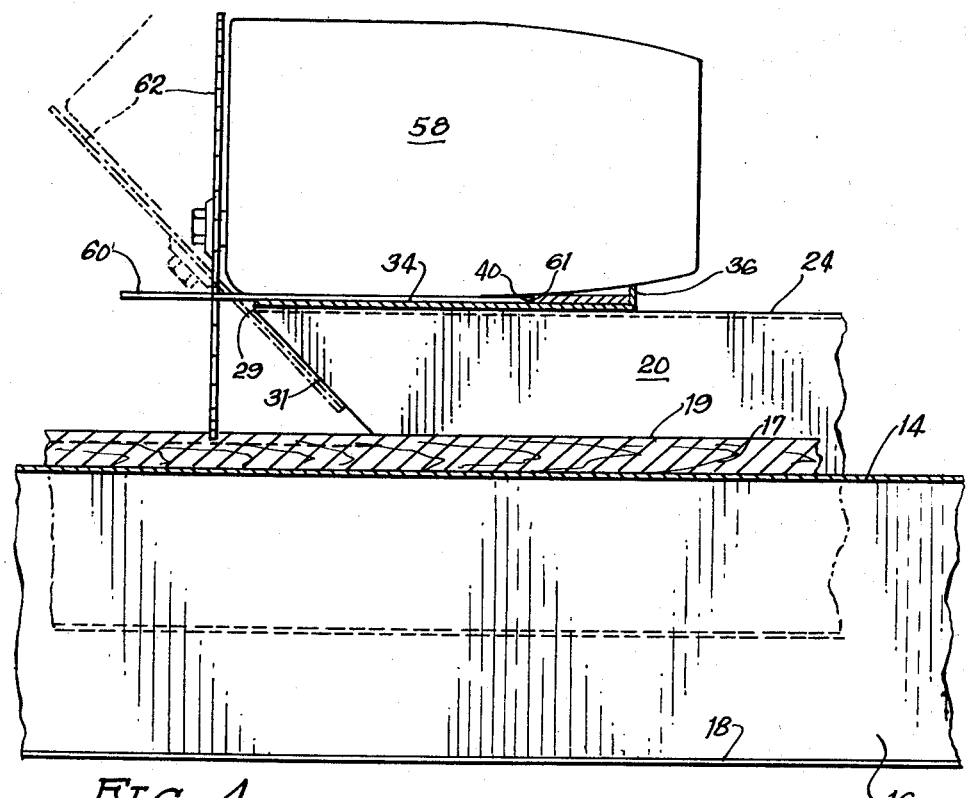
Fig. 4 is an enlarged side elevational view partly in section showing the portable electric saw on the guide track, and showing in dotted lines the position of the saw blade when making bevel cuts.

A guide track indicated generally by the reference numeral 32 comprises a straight elongated plate member 34 generally rectangular in cross section (see Figs. 1 and 4). In this particular embodiment, a vertical strengthening and saw motor supporting and positioning flange 36 is formed on the edge of member 34, but under some circumstances it may be omitted. In addition, a straight, planar, reinforcing strip 38 with a saw shoe guide edge 40 is secured to the edge of the guide track by any conventional means, but it is understood that the exact form or arrangement of this element does not form a critical part of this invention.

The guide track 32 is mounted on supporting surface 24 for pivotal movement in a horizontal plane, by means of a pivot pin 42 which extends through a suitable opening formed in the guide track 32 and the supporting surface 24 (see Figs. 1 and 3). It is noted, however, that the weight of the guide track is not carried by the pivot pin 42 so that the pivot pin can be small and made more economically.

Another portion of the guide track 32 may selectively rest on supporting surface 26 in some of its useful pivotal positions or in other of its useful pivotal positions a portion of the guide track may rest on the upper supporting surface 44 of a supporting element 45 described below.

The supporting surface 44, best seen in Fig. 1, is shaped like a sector of a circle and has a circular periphery, although it is understood that the exact shape of the supporting surface is not critical. Index holes 46 are positioned along the periphery of this surface in uniformly spaced angular relation to each other, but under some circumstances the uniform spacing of the index holes may not be necessary. In addition, the index holes 46 are provided with suitable indicia 48 for reasons to become apparent below. As best seen in Fig. 3, the supporting element 45 is mounted on the lower support flanges 28 and 30 by any suitable means.

In this particular embodiment, the guide track 32 is provided with a support leg 50 and a support leg reinforcing member 51. The support leg is secured to and depends from the end 52 of the guide track (see Figs. 1, 2, and 3). The lower end of this support leg is adapted to rest on the support surface 44 so that the guide track 32 is supported on supporting surfaces 24 and 44 in certain of its useful pivotal positions. An indexing pin 54 with a horizontally bent manipulating handle 55 is slidably mounted in a slot 56 in the support leg 50 and is held there by any conventional means. This indexing pin is designed to selectively penetrate any of the indexing holes 46 formed in the supporting surface 44. With this arrangement, and using the indicia 48, the guide track can be pivoted into many predetermined angular relationships with guideway 15 to cut various mitering angles in the work as described below.

It is further noted that the supporting surfaces 24 and 26 terminate on lines 27 and 29 around the central part of the base, and from these lines to the end of the base the top parts of side walls 22 and 24 are reduced so they remain below the work supporting surface 19 regardless of the position of the side walls 20 and 22 on the legs 16 (see Fig. 2). As will become apparent, this arrangement permits the work to be cut on a large number of mitering angles without the possibility of the saw blade encountering the side walls 20 and 22 or the supporting surfaces 24 and 26.

Boards are most frequently crosscut (cut at a 90° angle with respect to the edge) and the guide track 32 is mounted on supporting surface 24 to expedite this operation. In this embodiment when the guide track is exactly transverse to the guideway 15, the edge 33 of the guide track is parallel to and just covers the lines 27 and 29 defining the ends of the support surfaces 24 and 26. The precise position of the guide track for making cross cuts may be determined by means of a bolt 43 which is adapted to extend through suitably positioned and aligned openings 45 in the guide track and 47 in the supporting surface 26 (see Fig. 3). Alternatively the precise position of the guide track may be determined by forming a conventional positioning detent (not shown) on the lower surface of the guide track 32 for cooperation with a suitably positioned recess (not shown) in the supporting surface 26. In this way when the detent enters this recess the guide track will be properly positioned for making cross cuts. It is apparent that the proper position of the guide track for making cross cuts may be determined by many other expedients.

The more versatile portable electric saws 58 are pivotally mounted on a shoe 60 to permit the saw blade 62 to pivot and bevel cut (cuts inclined to the vertical) the work (see the dotted line saw blade position in Fig. 4). Since the saw blade 62 must be able to pass the edges of the side walls 20 and 22 and supporting surfaces 24 and 26 in both its vertical and bevel positions, the upper edges 31 of the side walls 20 and 22 must be inclined from the vertical as shown in Figs. 2 and 4 to prevent the saw blade from contacting the side walls in the bevel position. In addition this arrangement permits a portion of the supporting surface 26 to overhang side wall 22 to provide maximum support for the guide track 32 in its crosscut position (see Fig. 2).

Figure 2:
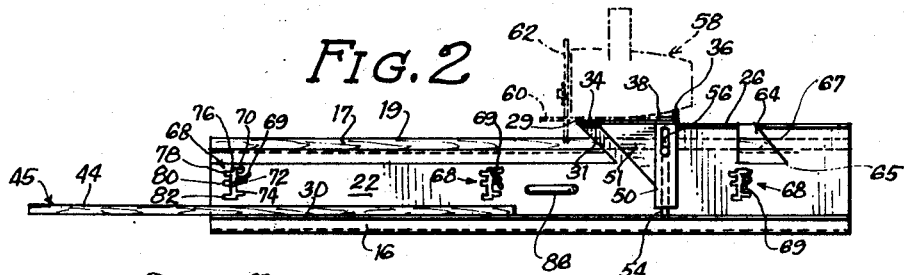
Fig. 2 is a side elevational view of the miter box shown in Fig. 1.

Next to cross cuts, boards are most often cut at mitering angles of 45°, and to facilitate this operation a slot and opening 64 is formed in supporting surface 26 and in the upper part of the side wall 22 (see Figs. 1 and 2). The opening 64 in the side wall 22 extends downward far enough so its base 65 is below the work supporting surface 19 in all positions of adjustment of the side wall 22 to prevent contact between the edge of the saw blade 62 and the wall 22 when making 45° mitering cuts. To facilitate positioning the guide track by this opening 64, an additional hole 53 may be formed in guide track 32 and an additional hole 47 may be formed in supporting surface 26, as shown in Fig. 1. These holes are positioned so they are in alignment with each other when the guide track is properly positioned for making the 45° mitering cuts. Bolt 43 is inserted in the aligned openings 53 and 47 and may be locked there by means of a wing nut.

As seen in Fig. 2 the opening 64 is provided with an inclined edge 67 to accommodate saw blade 62 in its bevel position. In addition this permits a portion of surface 26 to overhang the base 65 of the opening for greater support of the guide track. When it is desired to cut the work at a 45° mitering angle on the opposite side of the cross cut line, the work need only be turned over in a manner well known in the art.

With the arrangement described so far, it is apparent that the guide track 32 will be supported on supporting surfaces 24 and 26 when making crosscut and 45° angle mitering cuts, and when cutting other mitering angles, the guide track will be supported by supporting surfaces 24 and 44. Consequently the strength and the amount of material used in making the guide track 32 can be substantially reduced for reasons of economy without causing it to have an objectionable deflection due to the weight of the electric saw.

The distance between the guide track 32 and the work supporting surface 19 must be adjustable to correlate the size or thickness of the work with the size of the saw blade mounted in the portable electric saw. For example, even if the saw blade of a portable electric saw is large enough to cut through the standard board sizes (1 inch, 2 inch and 4 inch), most commonly used in carpentry, when cutting other materials such as metal pipe or brick the saw blade must be changed. However, saw blades suitable for cutting these different materials are not always available in the same size as the saw blade used for cutting board, and in fact the available saw blade may be substantially smaller. As a result, unless the distance between the guide track 32 and the work supporting surface 19 is adjustable, the miter box could not be used when it became necessary to change the size of the saw blade. This would restrict the utility of the miter box. In addition, it is important for the distance of the guide track above the work to be adjusted so it is too small to permit the hand or fingers used to steady the work to be accidentally inserted underneath the guide track and in the path of the saw blade.

In this particular embodiment, the means for varying the distance between the guide track and the work supporting surface 19 involves adjustably mounting the side walls 20 and 22 on the legs 16 so that each fixed position of the side walls on the legs corresponds to a standard board size. Specifically, in this embodiment, three threaded bolts or rods 66 in spaced relation to each other extend outwardly through bolt receiving openings (not shown) in each of the legs 16 (see Figs. 2 and 3). The side walls 20 and 22 are provided with openings indicated generally by the reference numeral 68 for receiving each rod or bolt 66. In this particular embodiment, each opening 68 includes three vertically spaced horizontally extending rod receiving slots 70, 72 and 74. These slots are connected at one end to a vertical connecting slot 76 which communicates with one end of each of the rod receiving slots so that slots 70, 72 and 74 are all on one side of the vertical connecting slot 76. Three more vertically spaced horizontally extending slots 78, 80 and 82 are connected at one end to the opposite side of the vertical slot 76 in each opening 68. As seen in Fig. 2, slots 78, 80 and 82 are offset vertically from associated slots 70, 72 and 74 by small amounts for reasons to become apparent below. It is further understood and will become more apparent from a consideration of the operation of this structure that the openings 68 could have other configurations.

In the particular side wall adjusting and positioning means shown in Fig. 2, the rods 66 extend through horizontal slots 72 in the openings 68 in side walls 20 and 22. This supports the side walls on the legs 16 so that the supporting surfaces 24 and 26 are at the same level and hold the guide track 32 above the work supporting surface 19 a distance which permits the portable electric saw to cut 2 inch board. If the board being cut were changed in size to 1 inch board or to 4 inch board, the rods 66 would have to extend through slots 70 or 74 in order for the guide track 32 to be at the correct height for the work.

As seen in Fig. 3, wing nuts 69 in threaded engagement with the ends of the bolts or rods 66 are tightened to lock the rods 66 in the desired horizontal rod receiving slots 72. In order to change the horizontal slot penetrated by the rods 66, the wing nuts 67 are loosened and the side walls 20 and 22 are first shifted horizontally on the legs 16 until the rods 66 enter the vertical connecting slots 76. Then the side walls 20 and 22 are moved vertically until the rods 66 move to the level of the horizontal rod receiving slot which corresponds to the size or thickness of the work being cut. Finally, the side walls are again moved horizontally until the rods 66 move into the desired horizontal slots and are then locked in place by tightening the wing nuts 69. In this way the height of the guide track 32 over the work supporting surface 19 can be changed without removing the side walls or the rods 66 with the attached wing nuts from the legs.

The saw blades in the portable electric saws have to be sharpened from time to time, and this gradually decreases their diameter until finally the edge of the saw blade no longer reaches surface 19 even though bolts or rods 66 extend through the correct horizontal slots in the openings 68 corresponding to the size of the work. To compensate for their decrease in the saw blade diameter the vertically spaced horizontal compensating slots 78, 80 and 82 are used. Specifically, when the portable electric saw has a saw blade suitable for cutting 1 inch board, and due to repeated sharpening the edge of the blade no longer grazes the work supporting surface 19, the side walls 20 and 22 are shifted on the legs 16 so the rods 66 instead of extending through horizontal slots 70 extend through associated compensating slots 78. Similarly when the miter box is set to cut 2 inch board the rod 66 can be moved from slots 72 to compensating slots 80, and when cutting 4 inch board the rods move from slots 74 to compensating slots 82. For ease in carrying, a handle 86 is secured to the side wall 22 by any conventional means.

The miter box described above can be used to cut standard size board and other materials along a large number of closely spaced mitering angles, but in smaller shops the great majority of the work involves cutting the boards crosscut or at 45° mitering angles. For that reason, many shops would have no need for a miter box which can cut a large number of different mitering angles in board, and a simpler more compact miter box which more closely satisfies their specific needs may be preferable.

Figure 5:
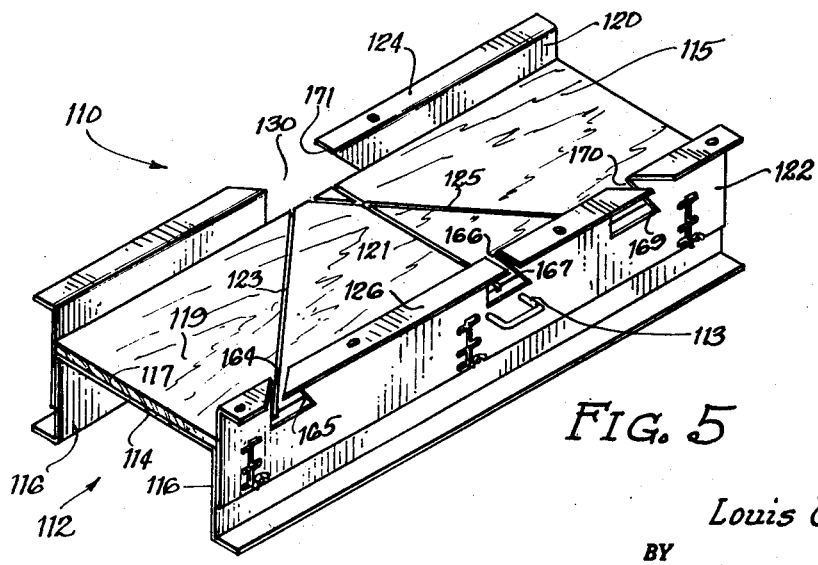
Fig. 5 is a perspective view of another embodiment of the miter box constructed according to the principles of this invention.

Such a simplified miter box is seen in Fig. 5 indicated generally by the reference numeral 110. This miter box has a base 112 and carrying handle 113 exactly identical to that described in the embodiment shown in Figs. 1–4. The base includes an upper web portion 114 and downwardly extending leg portions 116. A wooden work support member 117 with a planar upper work supporting surface 119 is secured to the upper web portion 114 by any conventional means (not shown).

Straight planar side walls 120 and 122 are adjustably mounted on legs 116 exactly as described in connection with the miter box described in Figs. 1–4, but in this embodiment there are no lower support flanges on the side walls because the sector shaped supporting surface 44 described above has been omitted.

The side walls 120 and 122 extend above the work supporting surface 119 and define thereby a substantially straight channel or guideway 115 for receiving and guiding the work. As seen the upper ends of the side walls are bent horizontally to form upper supporting surfaces 124 and 126.

A guide track (not shown) but identical to the one described in the embodiment of Figs. 1–4 except that the depending supporting leg 50 has been omitted, is pivotally mounted on supporting surface 124 the same way as in the miter box shown in Figs. 1–4. In addition, the guide track in this embodiment is supported by supporting surfaces 124 and 126 in all pivotal positions.

In this simplified miter box the supporting surface 126 and the upper side wall 122 are provided with openings 164, 166 and 170 formed in the supporting surface 126 and extending downward in side wall 122 so that the base of these openings is lower than the work supporting surface 119 in all positions of adjustment of the side walls. Similarly an enlarged opening 130 is formed in side wall 120 to accommodate the guide track and the portable electric saw in all of its pivotal positions. Edges 165, 167, 169 and 171 of these openings are inclined to the vertical, as shown, to accommodate the saw blade 62 in its bevel position. Additionally opening 166 is positioned on supporting surface 126 for cooperation with the guide track so the portable electric saw can crosscut the work, as indicated by the groove 121 formed in work supporting surface 119. Furthermore openings 164 and 170 are positioned on the work supporting surface 126 for cooperation with the guide track to cut 45° mitering angles in the directions indicated by grooves 123 and 125 formed in surface 119. In particular openings 164 and 170 are useful because they permit oppositely extending 45° mitering cuts to be made in the work without the necessity of turning it over.

In use the side walls and guideway are first adjusted in accordance with the size or thickness of the work. Next the work is laid on the guideway and the guide track is pivoted so it is in position to cut the desired mitering angle in the work. Then the portable electric saw is laid on the guide track with the edge 61 of its shoe bearing against the guide edge 40 of reinforcing strip 38. If a bevel cut is to be made, the saw blade is pivoted with respect to the shoe. Finally, the portable electric saw is turned on and is pushed over the guide track keeping the shoe edge 61 in sliding engagement with the guide edge, whereby the work is cut.

With the structure described above, the miter box is truly portable and self contained and can be carried from place to place without trouble or without requiring the presence of any special table or supporting surface. In addition, it can be stored away without having to be disconnected. Furthermore the miter box is compact and is designed to quickly and easily cut the most commonly used mitering angles on standard size boards.

The invention may be embodied in other forms without departing from the spirit or essential characteristics thereof as set forth in the claims, and the present embodiment is therefore to be considered as illustrative and not restrictive and it is intended to include all changes which come within the scope and range of the claims.

I claim:

1. A miter box for portable electric saws comprising in combination an elongated generally channel shaped sheet metal base including an upper web portion and downwardly extending leg portions, a work supporting surface on the web portion, substantially straight side walls mounted on the leg portions and extending above said web portion on each side thereof defining thereby a substantially straight guideway for the work over the web portion, first and second horizontal supporting surfaces secured to the upper part of each side wall, a guide track for a portable electric saw, one portion of said guide track pivotally secured to said first horizontal supporting surface on one side of the web portion, another portion of said guide track adapted to rest on said second horizontal supporting surface on the opposite side of said web portion in some of its pivotal positions, said guide track comprising an elongated straight plate member generally rectangular in cross section and with combined saw shoe guide and reinforcing means secured to its upper surface, a portion of the second supporting surface on at least one side of the web portion cut away from a substantially central part of the base to an end thereof and to a depth below the work supporting surface on the web portion, a third supporting surface parallel to said first and second supporting surfaces positioned below said work supporting surface on the web portion and supported on the lower part of the side walls, said third supporting surface shaped generally like a sector of a circle and having a circular periphery, index holes formed adjacent the periphery of this third supporting surface in uniform angularly spaced relation to each other, a support leg depending from a portion of the guide track with one end of the leg adapted to rest on the third supporting surface in some of the pivotal positions of the guide track whereby the guide track is supported in at least two places, an indexing pin slidably mounted on the support leg for selective entry into one of the index holes so that the guide track can be pivoted into many precisely determined positions and thereby cut work at many closely related mitering angles, and means for adjustably holding the side walls on the leg portions so that the first, second and third supporting surfaces are movable to selectively hold the guide track a plurality of spaced distances above the work supporting surface on the web portion, each of said distances corresponding to work of a particular thickness whereby the portable electric saw moving on the guide track can cut through work having these thicknesses.

2. A miter box for portable electric saws comprising in combination an elongated generally channel shaped sheet metal base including an upper web portion and downwardly extending leg portions, a work supporting surface on the web portion, substantially straight side walls mounted on the leg portions and extending above said web portion on each side thereof defining thereby a substantially straight guideway for the work, first and second horizontal supporting surfaces secured to the upper part of each side wall, a guide track for a portable electric saw, one portion of the said guide track pivotally secured to the first horizontal supporting surface on one side of the web portion, another portion of said guide track resting on the second horizontal supporting surface on the opposite side of the web portion, said guide track comprising an elongated straight plate member generally rectangular in cross section and with combined saw shoe guide and reinforcing means secured to its upper surface, at least two openings formed in the supporting surface and upper portion of a side wall for the passage of the saw blade therethrough, said openings extending downward from the second supporting surface with the base of the openings below the work supporting surface on the web portion, said openings having a downwardly inclined side edge to permit the passage of the blade through the openings when the blade is in its bevel position and so a portion of the supporting surface adjacent each opening overhangs a portion of the base of the openings for greater support of the guide track, said openings positioned so that when the guide track is adjacent one or the other of these openings and the portable electric saw is moved along the guide track across the web portion, the work in the guideways will be cut either straight across or at a 45° angle, and means for adjustably holding the side walls on the leg portions so that the supporting surfaces are movable to selectively hold the guide track a plurality of spaced distances above the work supporting surface on the web portion, each of said distances corresponding to work of a particular thickness whereby the portable electric saw moving on the guide track can cut through work having these thicknesses.

3. A miter box for a portable electric saw comprising in combination an elongated base including an upper web portion and downwardly extending leg portions, at least one side wall mounted for vertical adjustment on at least one leg portion and extending above said web portion to establish a substantially straight guideway for the work over said web portion, said side wall terminating in an upper supporting surface, a guide track for a portable electric saw, a portion of said guide track resting on the upper supporting surface of the side wall so that the guide track is movable vertically therewith, said guide track mounted for pivotal movement in a horizontal plane over said web portion, and positioning means cooperating with said guide track so that the guide track can be pivoted into various predetermined angular relationships with said substantially straight guideway.

4. A miter box for a portable electric saw comprising in combination an elongated generally channel shaped sheet metal base including an upper web portion and downwardly extending leg portions, at least one substantially straight side wall mounted for vertical adjustment on at least one leg portion and extending above said web portion to establish a substantially straight guideway for the work over said web portion, said side wall terminating in an upper supporting surface, a guide track for a portable electric saw, one portion of said guide track resting on the upper supporting surface of the side wall so that the guide track is movable vertically therewith, said guide track mounted for pivotal movement in a horizontal plane over said web portion, and positioning means in fixed relation to said base cooperating with said guide track so that the guide track can be pivoted into various predetermined angular relationships with said substantially straight guideway.

5. The miter box described in claim 4 wherein the guide track is pivotally mounted on the upper supporting surface of the side wall.

6. The miter box described in claim 5 including an additional supporting surface mounted for vertical adjustment with respect to the legs of the base, another portion of said guide track resting on said additional supporting surface so that the guide track is supported at two spaced positions.

7. The miter box described in claim 6 wherein said additional supporting surface is independently adjustable in the vertical direction.

8. A miter box for a portable electric saw comprising in combination an elongated generally channel shaped sheet metal base including an upper web portion and downwardly extending leg portions, a substantially straight side wall mounted for vertical adjustment on each leg portion and extending above said web portion to establish a substantially straight guideway for the work over said web portion, each side wall terminating in an upper supporting surface, a guide track for a portable electric saw, one portion of said guide track mounted on one supporting surface for pivotal movement in a horizontal plane over said web portion and another portion of said guide track resting on the other supporting surface in at least some pivotal positions of said guide track so that the guide track is supported at two places, at least one slot formed in at least one of said supporting surfaces, and means for positioning said guide track so when a portable electric saw is moved on said guideway over said web portion the blade will pass through said slot.

9. The miter box described in claim 8 including rods in spaced relation to each other extending outwardly from each leg, said side walls provided with an opening associated with each rod, each opening including a plurality of vertically spaced rod receiving portions, each vertically spaced rod receiving portion related to work of a particular thickness so that when the rods extend through the rod receiving portions of the openings related to work of a particular thickness they hold the side walls on the legs in such a way that the guide track is maintained above the web portion the correct distance for cutting work of that particular thickness whereby the distance of the guide track above the web portion can be changed by inserting said rods through the rod receiving portions of the openings which correspond to the thickness of the work being cut.

10. The miter box described in claim 9 wherein a compensating rod receiving portion is associated with each rod receiving portion in vertically spaced relation thereto so that when the diameter of the cutting blade in the portable electric saw is reduced due to repeated sharpening these compensating rod receiving portions receive the rods on the leg portions whereby the guide track is maintained the correct distance above the web portion for cutting work of a particular thickness when using a reduced diameter cutting blade in the portable electric saw.

11. The miter box described in claim 9 wherein each opening in a side wall includes a connecting slot communicating with each rod receiving portion so that the side walls can be shifted on the legs so each rod can move out of one rod receiving portion through the connecting slot to another rod receiving portion whereby the height of the supporting surfaces on the side walls and the guide track above the web portion can be adjusted without removing the side walls from the legs.

12. The miter box described in claim 11 including locking means for releasably locking the rods in the rod receiving openings.

13. The miter box described in claim 11 wherein a compensating rod receiving portion is associated with each rod receiving portion in closely spaced vertical relation thereto so that when the diameter of the cutting blade in the portable electric saw is reduced due to repeated sharpening these compensating rod receiving portions receive the rods on the leg portions instead of the rod receiving portions whereby the guide track is maintained the correct distance above the web portion of the base for cutting work of a particular thickness when using a reduced diameter cutting blade in the portable electric saw.

14. The miter box described in claim 13 wherein each rod receiving portion is a horizontally extending slot communicating at one end with the connecting slot in such a way that the rod receiving portions of each opening are all on one side of the connecting slot, and said compensating rod receiving portions comprising horizontally extending slots communicating at one end with said connecting slot in such a way that all the compensating rod receiving portions are on the opposite side of the connecting slot from the rod receiving portions.

15. A miter box for a portable electric saw comprising in combination an elongated base including an upper surface and downwardly extending side portions, at least one side wall mounted for vertical adjustment on said base and extending above said upper surface, said side wall terminating in an upper supporting surface, a guide track for a portable electric saw, a portion of said guide track resting on the upper supporting surface of the side wall so that the guide track is movable vertically therewith, said guide track mounted for pivotal movement in a horizontal plane over said upper surface, and positioning means cooperating with said track so that the guide track can be pivoted into various predetermined angular relationships with said elongated base.

References Cited in the file of this patent

UNITED STATES PATENTS

| 1,618,341 | Howland | Feb. 22, 1927 |
| 1,842,630 | Rodning | Jan. 26, 1932 |
| 2,306,512 | Whitney | Dec. 29, 1942 |
| 2,595,322 | Avery | May 6, 1952 |
| 2,656,860 | Thayer | Oct. 27, 1953 |
| 2,677,399 | Getsinger | May 4, 1954 |
| 2,770,265 | Pollock | Nov. 13, 1956 |
| 2,903,026 | Frydenlund | Sept. 8, 1959 |